United States Patent
Morimoto et al.

(10) Patent No.: US 6,879,635 B2
(45) Date of Patent: Apr. 12, 2005

(54) METHOD OF DECODING TIME INFORMATION OF VIDEO IMAGE

(75) Inventors: Michiyo Morimoto, Fuchu (JP); Atsushi Asano, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 666 days.

(21) Appl. No.: 09/893,632

(22) Filed: Jun. 29, 2001

(65) Prior Publication Data

US 2002/0001351 A1 Jan. 3, 2002

(30) Foreign Application Priority Data

Jun. 30, 2000 (JP) ....................................... 2000-200125

(51) Int. Cl.[7] .............................................. H04N 7/12
(52) U.S. Cl. ............. 375/240.28; 375/240; 375/240.01; 375/240.12; 375/240.26
(58) Field of Search ........................... 375/240, 240.01, 375/240.12, 240.25, 240.26, 240.27, 240.28; 348/425.4; 370/498

(56) References Cited

U.S. PATENT DOCUMENTS

| 5,818,547 | A | * | 10/1998 | Ozaki ....................... 348/425.4 |
| 5,956,088 | A | * | 9/1999 | Shen et al. ............. 375/240.25 |
| 6,047,027 | A | * | 4/2000 | Miyagosi et al. ....... 375/240.28 |
| 6,282,209 | B1 | * | 8/2001 | Kataoka et al. ............. 370/498 |
| 6,330,286 | B1 | * | 12/2001 | Lyons et al. ............ 375/240.28 |
| 6,542,549 | B1 | * | 4/2003 | Tan et al. ............... 375/240.26 |

FOREIGN PATENT DOCUMENTS

JP          10-234033          9/1998

* cited by examiner

Primary Examiner—Allen Wong
(74) Attorney, Agent, or Firm—Finnegan, Henderson, Farabow, Garrett & Dunner, L.L.P.

(57) ABSTRACT

A method for decoding time data comprising decoding an encoded bit stream in units of one frame to generate decoded video data and a plurality of decoded header information items for each frame, detecting the time data included in each of the header information items, and determining identical time data which define identical points of time and are detected from at least two of the header information items as frame time data determining the point of time for outputting the decoded frame.

2 Claims, 6 Drawing Sheets

FIG. 1

DATA CONFIGURATION OF ONE FRAME

METHOD OF DECODING TIME INFORMATION OF VIDEO IMAGE

CROSS-REFERENCE TO RELATED APPLICATIONS

This application is based upon and claims the benefit of priority from the prior Japanese Patent Application No. 2000-200125, filed Jun. 30, 2000, the entire contents of which are incorporated herein by reference.

BACKGROUND OF THE INVENTION

1. Field of the Invention

The present invention relates to a method of decoding time data of a video image in a video decoding apparatus.

2. Description of the Related Art

In MPEG-1, MPEG-2, H. 261, and H. 263 encoding systems that are international standards of video encoding, only one item of information containing time data for a variety of time controls during decoding exists in one frame. In contrast, MPEG-4 that is an international standard for encoding a video image is a system having error resilience, assuming use in a transmission system with a plenty of errors such as radio communication including mobile communication. With respect to frame time data as well, error resilience is ensured to a certain extent.

That is, in the MPEG-4, sync restoration markers (resync markers) are inserted into one frame, and each frame is divided into a plurality of packets, making it possible for such each packet to provide header information containing time data. In a video image encoding system such as MPEG-1 and MPEG-2 in which time data exists in only the first header information in one frame, time data could not be decoded if the first header information is not correctly decoded due to an error or the like at the decoding side. However, if a plurality of header information items containing time data are provided in each frame, even if an error occurs, frame time data can be always decoded.

Thus, a system in which a plurality of header information items containing time data in each frame are provided includes a problem that time data of the header information items in the same frame indicate different values due to an error. In such a case, it is not specified conventionally as to what item of time data is employed as frame time data.

In Jpn. Pat. Appln. KOKAI Publication No. 10-234033, there is disclosed a system for determining an error according to whether time data is present or absent within the range of an frame-interval time as follows. That is, a counter for counting the number of bits in an inputted encoded bit stream is provided in order to determine whether or not decoded time data contains an error. The number of bits in the bit stream of the received previous frame is counted, the number of generated bits is obtained, and an frame-interval time is obtained by the number of generated bits and the control threshold and transmission speed of a transmission buffer. Then, this frame-interval time is compared with decoded time data.

This system is applicable even if a plurality of header information items containing time data exist in one frame. However, determination processing, in particular, processing for obtaining an frame-interval time using a number of parameters such as the number of bits in an encoded bit stream or the number of generated bits is very complicate. Thus, there is a problem that this system is disadvantage in view of cost efficiency or requires a large amount of processing time.

As described above, in a video image decoding apparatus, it is required to decode correct time data irrespective of an error. However, there has been a problem that a system of determining an error of time data based on a conventional technique is very complicate, which requires a large amount of processing time.

BRIEF SUMMARY OF THE INVENTION

It is an object of the present invention to provide a method of decoding time data of an encoded video image, which is capable of decoding correct time data as frame time data irrespective of an error in a transmission system without requiring complicate determination processing if a plurality of header information items containing time data are provided in one frame.

According to a first aspect of the present invention, there is provided a method for decoding time data which defines a point of time for outputting a decoded frame of a video image, the method comprising: decoding an encoded bit stream in units of one frame to generate decoded video data and a plurality of decoded header information items for each frame; detecting the time data included in each of the header information items; and determining identical time data which define identical points of time and are detected from at least two of the header information items as frame time data determining the point of time for outputting the decoded frame.

According to a second aspect of the invention, there is provided a method for decoding time data which defines a point of time for decoding and outputting a picture of a video image, the picture including at least one field, the method comprising: decoding an encoded bit stream in units of one picture to generate decoded video data and a plurality of decoded header information items for each picture; detecting time data included in each of the header information items; and determining identical time data which define identical points of time and are detected from at least two of the header information items as picture time data indicating the point of time for outputting the decoded frame.

According to a third aspect of the invention, there is provided a method for decoding time data which defines a point of time for outputting a decoded frame of a video image, the method comprising: searching a plurality of header information items of the frame for time data contained in an encoded bit stream obtained by encoding the video image; and determining, as the time data which defines the point of time for outputting the decoded frame, time data detected from two or more of the header information items and defining identical points of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Hereinafter, preferred embodiments of the present invention will be described with reference to the accompanying drawings.

Figure 1:
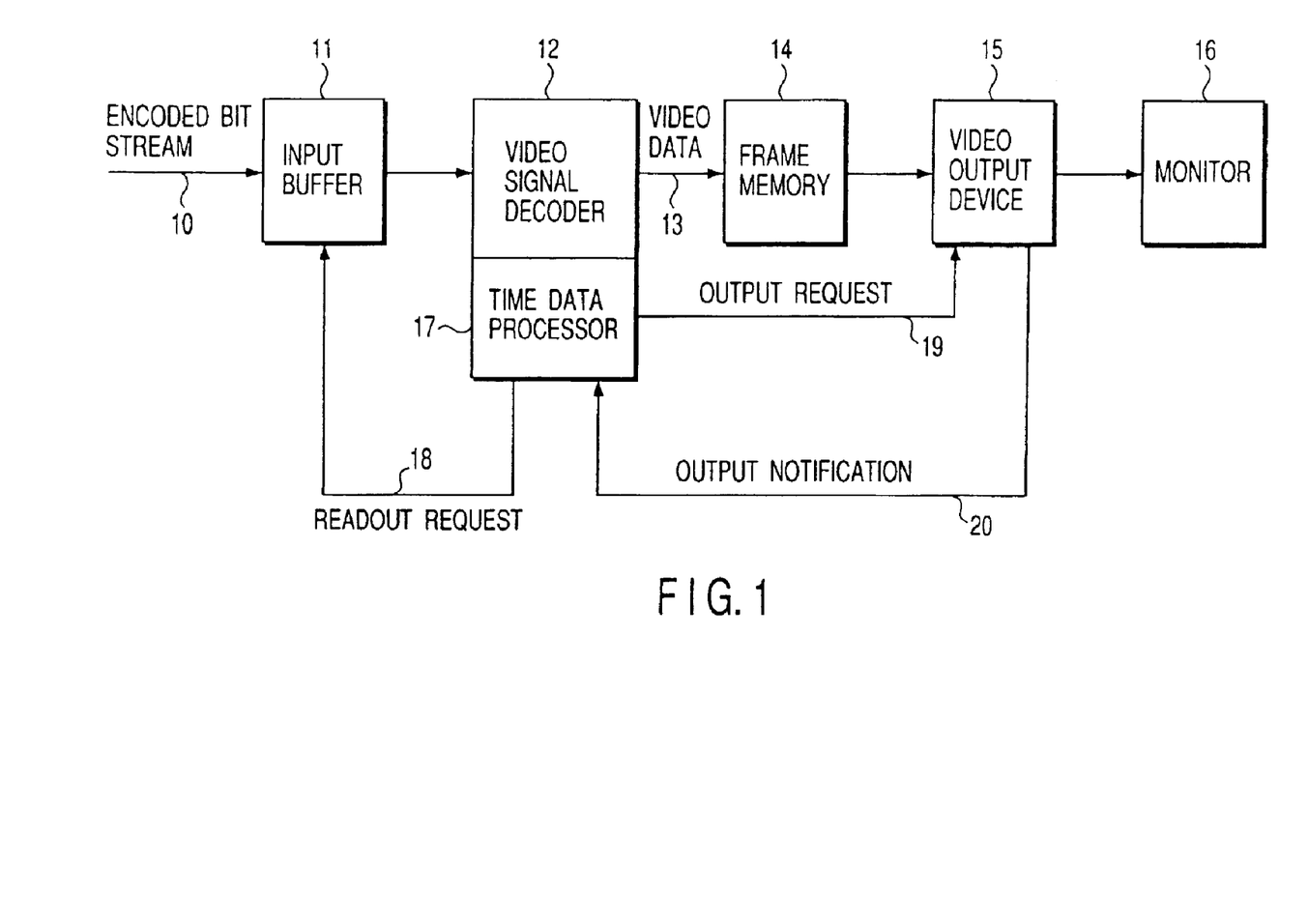
FIG. 1 is a block diagram of a video image decoding apparatus to which a video image time data decoding method according to one embodiment of the present invention is applied.

According to a video image decoding apparatus shown in FIG. 1, an encoded bit stream 10 to be inputted includes encoded data obtained by encoding a video signal. This encoded bit stream 10 is temporarily stored in an input buffer 11 prior to decoding, and is inputted to a video signal decoder 12. The encoded bit stream 10 is decoded by means of the video signal decoder 12, and is inputted to a frame memory 14 for each frame (or a picture) as video image data 13. The video data outputted from the frame memory 14 is inputted to a monitor 16 via a video output device 15, and the decoded video image is reproduced.

The video signal decoder 15 provides with a time data processor 17 which decodes time data for managing time data and performs other processing. The time data processor sends an output request 19 to the video output device 15 according to the decoded time data. In addition, when the time data processor 17 accepts an output (display) notification 20 from the video output device 15, the processor 17 delivers a readout request 18 to the input buffer 11. When the video decoder 12 accepts a next frame from the input buffer 11, it starts decoding of the next frame.

There will now be described processing for decoding frame time data at the time data processor 17.

Figure 2A:
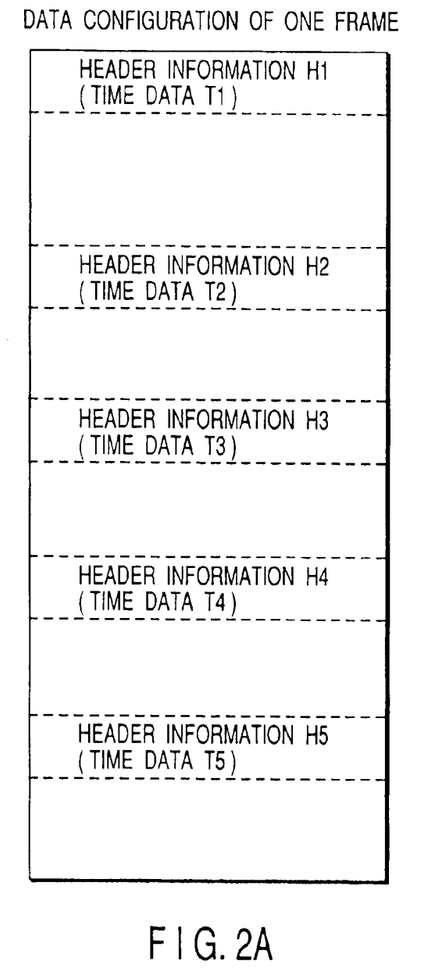
FIGS. 2A, 2B and 2C are views showing a packet configuration, a data configuration and a header configuration of one frame of a video image according to the method of the above embodiment.
Figure 2B:
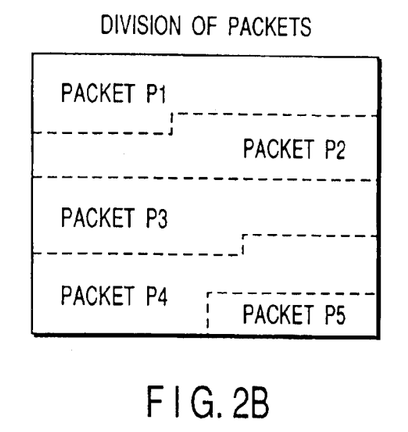
Figure 2C:
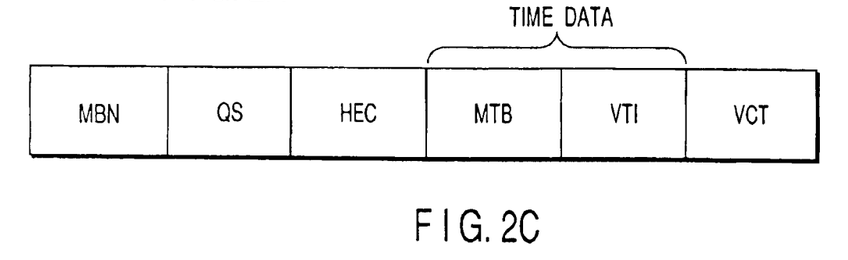

Assume that one frame of a video image is divided into five packets P1 to P5 as shown in FIG. 2B, and header information items H1 to H5 of packets P1 to P5 contains time data items T1 to T5, as shown in FIG. 2A. The initial header information item H1 includes frame information regarding the frame which is formatted according to a conventional video encoding scheme. The frame information includes time data which defines for decoding and displaying (outputting) the frame. Each of the header information items H2 to H5 is configured by MBN, QS, HEC, MTB, VTI and VCT as shown in FIG. 2C, for example. MBN is macro block number information indicating the number of the initial macro block of a video packet, QS quantization step size information indicating a quantization step size of the video packet, and HEC a header extension code indicating a flag indicating whether or not important information is added to the video packet. MTB (Modulo Time Base) and VTI (VOP Time Increment) indicate time data which define a point of time for outputting (displaying) a decoded frame of a video image. MTB is the local time base in one second resolution units (1000 milliseconds), and VTI is the absolute time from the syncronization point marked by MTB in the number of clock ticks. VCT is VOP coding type information indicating a coding method.

Here, although time data items T1 to T5 contained in the header information items H1 to H5 of the same frame are essentially directed to identical time data (frame time data) which define identical points of time, a part of the information may not be decoded (detected) due to an error in a transmission path or the like or a different value is obtained even if it is decoded. According to the embodiments of the present invention, even in such a case, time data can be correctly decoded in accordance with the following routines.

<First Time Data Decoding Routine>

Figure 3:
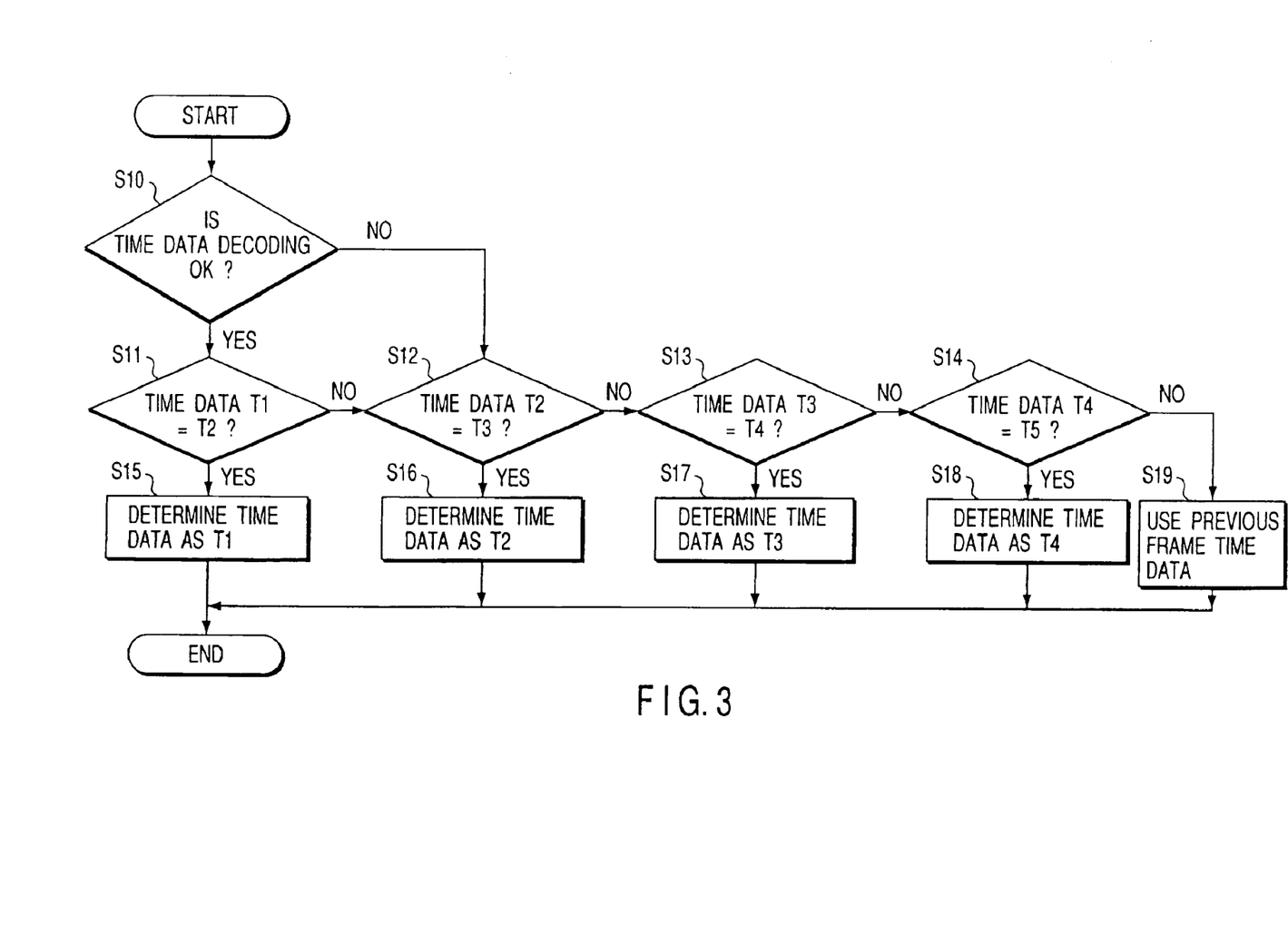
FIG. 3 is a flow chart illustrating a first time data decoding routine in the above embodiment.

A first time data decoding routine according to the present invention will be described with reference to the flow chart shown in FIG. 3. FIG. 3 shows a flow of decoding time data of the current frame from a plurality of header information items in one frame (the current frame). In this first time data decoding routine, a plurality of header information items in the same frame (current frame) is searched for time data contained in an encoded bit stream. When identical time data defining identical points of time is detected from two of header information items that are continuous in time, the detected time data is determined as time data of the current frame.

That is, it is checked whether or not the time data item T1 contained in the first header information item H1 has been decoded (detected) (step S10). When the time data item T1 is decoded, T1 is compared with the time data item T2 contained in the second header information item H2 (step S11). When T1=T2, the current frame time data is determined as T1 (=T2) (step S15).

On the other hand, if the time data item T1 is not decoded due to an error or the like at the step S10, the time data item T2 is compared with the time data item T3 contained in the third header information item H3 (step S12). When T2=T3, the current frame time data is determined as T2 (=T3) (step S16).

In addition, if T2≠T3 at the step S12, the time data item T3 is compared with the time data item T4 contained in the next header information item H4 (step S13). When T3=T4, the frame time data is determined as T3 (=T4) (step S17).

Similarly, if T3≠T4 at the step S13, time data item H4 is compared with the time data item T5 contained in the next header information item H5 (step S14). When T4=T5, the frame time data is determined as T4 (=T5) (step S18). The header information item H5 corresponds to the last header information of the frame. If T4≠T5 at the step S14, it is assumed that time data has not been decoded successfully from the current frame, and the previous frame time data is substituted as the current frame time data (step S19).

In this way, according to the first time data decoding routine, time data contained in two continuous header information items is simply compared from the first header information item H1 in one frame, and when these time data items are coincident with each other, the time data is defined as the current frame time data. Thus, simple processing for mainly comparing two time data items is performed without performing complicate determination processing that has been necessary in the conventional technique, whereby error-free, correct time data can be easily decoded as frame time data.

In the foregoing description, if the identical time data has been detected from two header information items that are continuous in time, the time data is defined as the current frame time data. However, if the identical time data has been detected from three or more header information items that are continuous in time, the time data may be defined as the current frame time data.

<Second Time Data Decoding Routine>

Figure 4A:
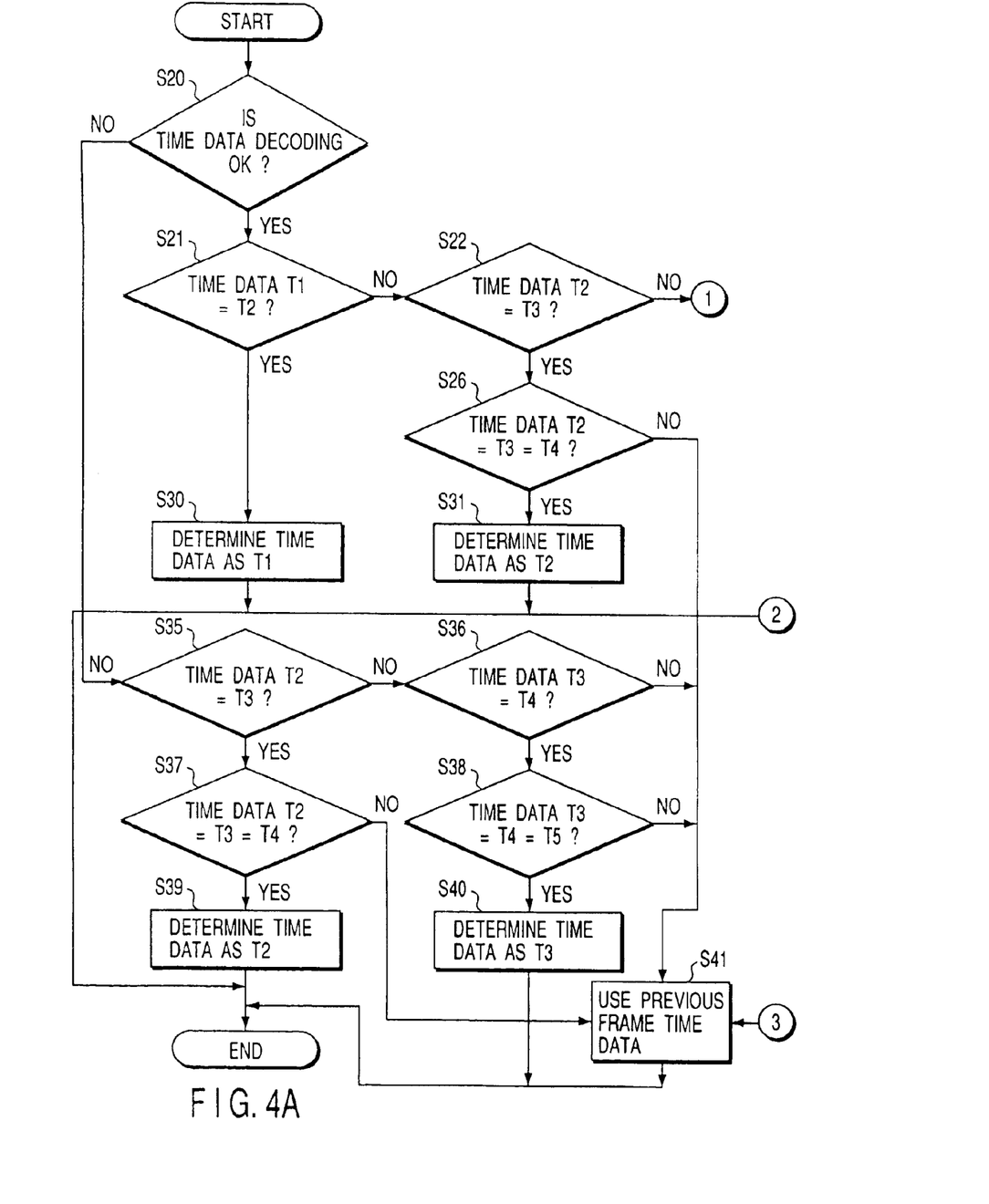
FIGS. 4A and 4B are flow chart illustrating a second time data decoding routine in the above embodiment.
Figure 4B:
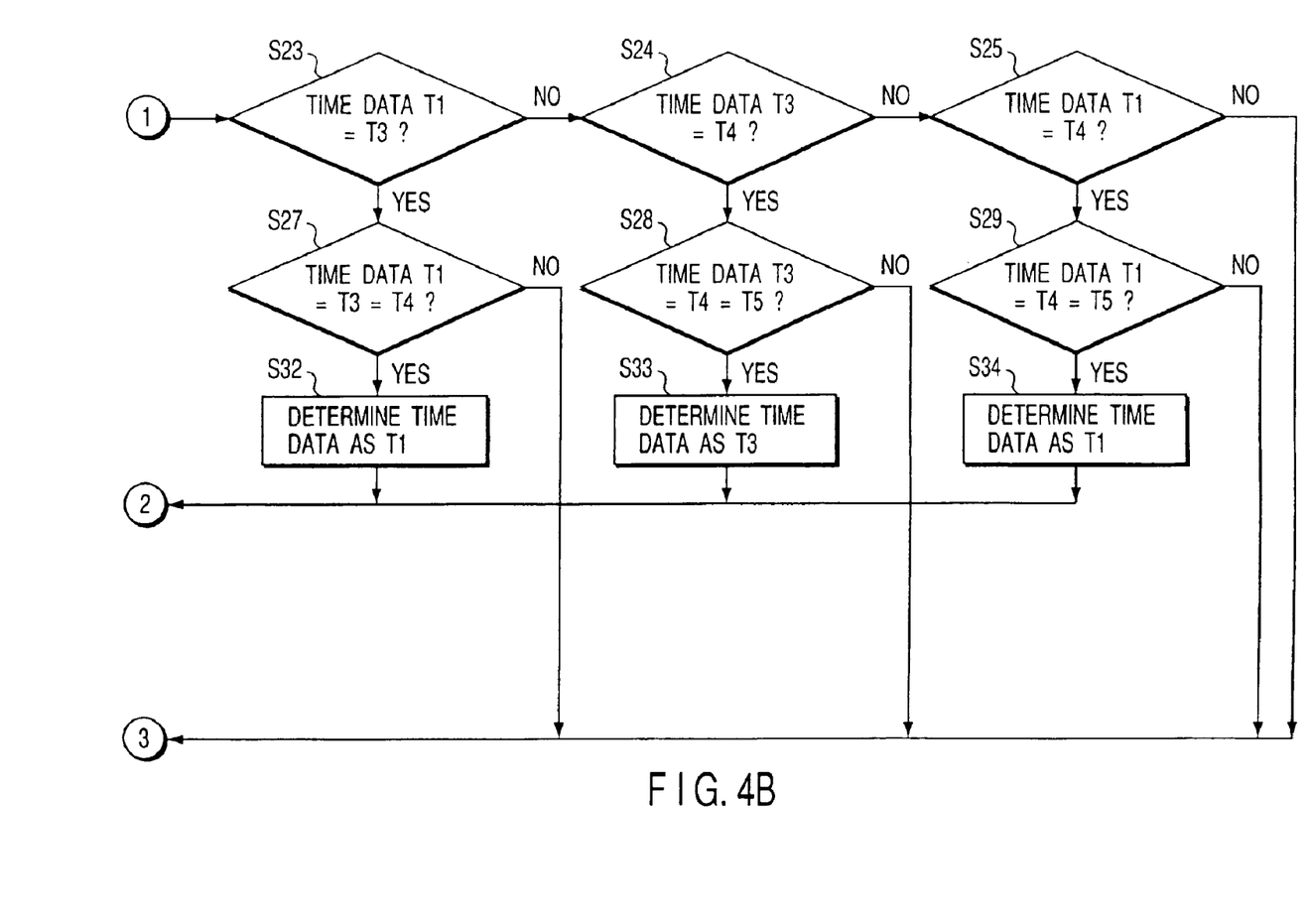

Now, a second time data decoding routine according to the present invention will be described with reference to the flow chart shown in FIG. 4. In FIG. 4 as well, as in FIG. 3, there is shown a flow of decoding the current frame time data from a plurality of header information items in one frame.

In this second time data decoding routine, as in the first time data decoding routine, after the time data items contained in an encoded bit stream have been sequentially searched from a plurality of header information items in the same frame, frame time data is decoded in accordance with four cases described below (roughly divided into two cases "a" and "b").

[Case a1] In the case where time data identical to the time data item T1 detected from the first header information item H1 has been detected from the second header information item H2, the time data item T1 (=T2) detected from the first header information item H1 is defined as the current frame time data.

[Case a2] In the case where time data identical to the time data item T1 detected from the first header information item H1 is not detected from the second header information item H2 and time data identical to the time data item T1 detected from the first header information item H1 has been detected from two continuous items of third and subsequent header information items, the time data item T1 detected from the first header information item H1 is defined as the current frame time data.

[Case b1] In the case where time data identical to the time data item T1 detected from the first header information item H1 is not detected from the second header information item H2 and identical time data has been detected from three continuous items of second and subsequent header information items, identical time data detected from three continuous header information items is defined as the current frame time data.

[Case b2] In the case where time data is not detected from the first header information item H1, and identical time data has been detected from three continuous items of second and subsequent header information items, identical time data detected from three continuous header information items is defined as the current frame time data.

More specifically, it is first checked whether or not the time data item T1 contained in the first header information item H1 has been decoded (detected) (step S20). When this time data item T1 has been decoded, T1 is compared with the time data item T2 contained in the second header information item H2 (step S21). When T1=T2, frame time data is determined as T1 (=T2) (step S30). This case corresponds to [Case a1], and the above processing is similar to that exemplified in FIG. 3. The subsequent processing is different from that exemplified in FIG. 3.

In the case where T1≠T2 at the step 21, the time data item T2 is then compared with the time data item T3 contained in the third header information item H3 (step S22). When T2=T3, T2 and T3 are further compared with the time data item T4 contained in the next header information item H4 (step S26). When T2=t3=T4, frame time data is determined as T2 (=T3=T4) (step S31). This case corresponds to [Case b1].

In the case where T2≠T3 at the step S22, T1 and T3 are then compared with each other (step S23). When T1=T3, T1, T3, and T4 are compared with each other (step S27). When T1=T3=T4, frame time data is determined as T1 (=T3=T4) (step S32). This case corresponds to [Case a2].

In the case where T1≠T3 at the step S23, T3 and T4 are then compared with each other (step S24). When T3=T4, T3, T4, and T5 are further compared with each other (step S28). When T3=T4=T5, frame time data is determined as T3 (=T4=T5) (step S33). This case corresponds to [Case b1].

In the case where T3≠T4 at the step S24, T1 and T4 are then compared with each other (step S25). When T1=T4, T1, T4, and T5 are further compared with each other (step S29). When T1=T4=T5, frame time data is determined as T1 (=T4=T5) (step S34). This case corresponds to [Case a2].

On the other hand, if the time data item T1 is not decoded due to an error or the like at the step S20, T2 and T3 are compared with each other (step S35). When T2=T3, T2 and T3 are further compared with T4 (step S37). When T2=T3=T4, frame time data is determined as T2 (=T3=T4) (step S39). This case corresponds to [Case b2].

Further, if T2≠T3 at the step S35, T3 and T4 are then compared with each other (step S36). When T3=T4, they are compared with T5 (step S38). When T3=T4=T5, frame time data is determined as T3 (=T4=T5) (step S40). This case corresponds to [Case b2].

In the case where frame time data cannot be determined by way of the above described processing, it is assumed that time data has not been decoded successfully from the current frame, and the previous frame time data is substituted as current frame time data (step S41).

In this way, in the second time data decoding routine as well, simple processing for mainly comparing two time data items is performed without performing complicate determination processing that has been necessary in the conventional technique, whereby error-free, correct time data can be easily decoded as frame time data.

In addition, according to the second time data decoding routine, frame time data is decoded according to the cases such as [Case a1], [Case a2], [Case b1], and [Case b2] described above. Thus, reliability of time data decoded relevant to an error or the like is improved more remarkably as compared with that in the first time data decoding routine, and there is a higher possibility that time data is decoded.

Now, other time data decoding routines in the embodiments of the present invention will be described by showing an example when one frame of a video image is divided into five packets P1 to P5 as shown in FIGS. 2A and 2B, and header information items H1 to H5 of the packets P1 to P5 contains time data items T1 to T5.

<Third Time Data Decoding Routine>

In the case where the time data items T1 to T5 contained in all the packets H1 to H5 in one frame are all the same, frame time data is defined as the time data item T1.

<Fourth Time Data Decoding Routine>

When T1≠T2, if the time data items T1 and T3 to T5 are all the same, frame time data is defined as T1. In this case, when T1=T3 and T1=T3=T4, when identical time data is obtained, frame time data may be defined as T1. Further, when time data continuously identical to T1 over three or more header information items such as T1=T3=T4=T5 . . . is obtained, frame time data may be defined as T1.

<Fifth Time Data Decoding Routine>

In the case where T1 cannot be decoded due to an error or the like, and the time data items T2 to T5 are all the same, frame time data is defined as T2. In this case, when continuously identical time data items such as T2=T3 and T2=T3=T4 are obtained, frame time data may be defined as T2. Further, when continuously identical time data over four or more header information items such as T2=T3=T4= T5 . . . is obtained, frame time data may be defined as T2.

<Sixth Time Data Decoding Routine>

When T1≠T2, two items among the time data items T3 to T5 are header information having the identical time data as T1, and the remaining one is header information having the time data as T2, the time data item that contains more header information items having the identical time data item (T1 in this case) is defined as frame time data. In this case, a type of header information containing the identical time data as T1 (or T2) is not taken into consideration. More specifically, the identical time data detected from the header information items which are larger in number than the header information items which have another identical time data is defined as the frame time data.

(Seventh Time Data Decoding Routine)

As is the case with T1≠T2≠T3, T3=T4 and T2=T5, if two or more header information items having the identical time data exist, the time data of the continuous header information items (T3 in this case) which have the identical time data is defined as frame time data.

In any of the above third to seventh time data decoding routines as well, if time data items T1 to T5 are completely different from each other, the previous frame time data is defined as the current frame time data, as in the first and second time data decoding routines.

Figure 5:
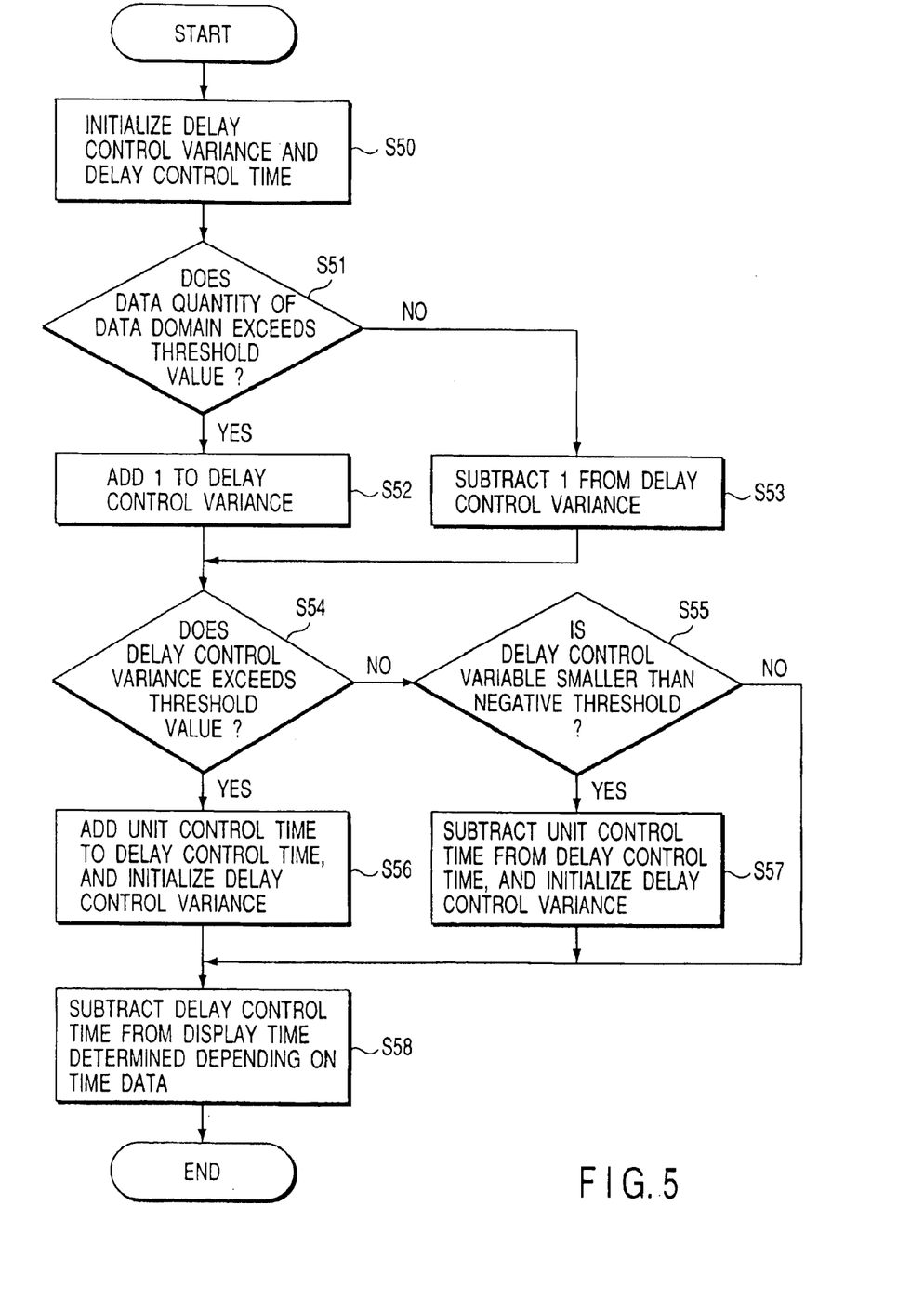
FIG. 5 is a flow chart illustrating a time data delay control routine in the above embodiment.

Now, delay control at the time data processor 17 of FIG. 1 will be described with reference to FIG. 5. This delay control is for compensating for a delay of decoded frame time data. Specifically, a delay time that occurs if frame time data is incorrectly decoded or a delay time that occurs if there exists only one item of header information having time data in one frame is compensated for.

Basically, in this delay control, the decoded frame time data as described above is advanced by a unit time if a data quantity of a data domain in an input buffer 11 exceeds a predetermined threshold value, and is delayed by a unit time if the data quantity is not more than the threshold value.

First, a delay control variance and a delay control time are initialized (step S50). Next, it is checked for each frame whether or not a data quantity (remaining quantity of data) of a data domain in the input buffer 11 into which an encoded bit stream 10 is stored in FIG. 1 exceeds a threshold value (step S51).

Here, the threshold value is defined as 960 bytes corresponding to 120 ms, assuming that the data transmission speed is 64 kilobits per second, for example. Further, based on the similar assumption, the threshold value for delay control variance described later is defined as 8 times, and a unit control time is defined as 33 ms.

If a remaining quantity of data of a data domain in the input buffer 11 at the step S51 exceeds a threshold value, 1 is added to the delay control variance (step S52). If the remaining quantity of data is not more than the threshold value, 1 is subtracted from the delay control variance (step S53).

Next, it is checked whether or not the delay control variance exceeds a threshold value (step S54). If it exceeds the threshold value, a unit control time is added to the delay control time, and the delay control variance is initialized (step S56).

In the case where the delay control variance is not more than the threshold value, it is checked whether or not the delay control variance is smaller than a negative threshold value (step S55). If it is not more than the negative threshold value, a unit control time is subtracted from the delay control time, and the delay control variance is initialized (step S57).

The thus determined delay control time is subtracted from time data obtained as previously (display time on a monitor 16 determined depending on time data), and the subtracted time is defined as frame time data (step S58). In this manner, proper frame time data free of an integrated delay time or an incorrectly advanced time can be obtained.

In the foregoing description, although the threshold value of remaining quantity of data has been defined as 960 bytes corresponding to 120 ms, even if the data transmission speed is assumed to be 64 kilobits per second, this threshold value can be arbitrarily set without being limited thereto. In addition, the threshold value of a delay control variance and a unit control time are not limited to the above mentioned values.

According to such a time data decoding method based on the present invention, simple processing for mainly comparing two time data items is performed without performing complicate determination processing, thereby making it possible to easily decode error-free, correct time data as frame time data.

Further, in a time data decoding method according to the present invention, the decoded frame as described above is advanced by a unit time if a data quantity in a buffer data domain in which an encoded bit stream is stored exceeds a predetermined threshold value, and is delayed by a unit time if the data quantity is equal to or smaller than the threshold value, thereby performing compensation for a delay time that occurs if frame time data is incorrectly decoded or if only one item of header information having time data exists in one frame.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for decoding time data which defines a point of time for outputting a decoded frame of a video image, the method comprising:

searching a plurality of header information items of each frame for the time data for each frame, the time data being contained in an encoded bit stream obtained by encoding the video image;

determining time data detected from the first one of the header information items as the time data defining the point of time for outputting the decoded frame when time data identical to time data detected from the first one of the header information items has been detected from the second one of the header information items, and when time data identical to time data detected from the first header information item is not detected from the second header information item and time data identical to the time data detected from the first header information item is detected from two continuous items of third and subsequent header information items; and determining time data detected from the continuous three header information items as the picture time data defining the point of time when the time data identical to time data detected from the first header information item is not detected from the second header information item and has been detected from three continuous items of second and subsequent header information items, and when the time data is not detected from the first header information item and time data detected from three continuous items of the second and subsequent header information items define identical points of time.

2. A method according to claim 1, wherein, when a data quantity of a buffer data domain in which the encoded bit stream is stored exceeds a predetermined threshold value, decoded frame time data is advanced by a unit time, and when the data quantity is equal to or smaller than the threshold value, the frame time data is delayed by a unit time.

* * * * *